United States Patent [19]
Pollitt

[11] Patent Number: 5,131,662
[45] Date of Patent: Jul. 21, 1992

[54] HIGH PERFORMANCE ONE-PIECE GOLF BALL

[75] Inventor: Duncan H. Pollitt, Milton, Fla.

[73] Assignee: Dunlop Slazenger Corporation, Greenville, S.C.

[21] Appl. No.: 667,608

[22] Filed: Mar. 7, 1991

Related U.S. Application Data

[63] Continuation-in-part of Ser. No. 602,053, Oct. 24, 1990, abandoned, which is a continuation of Ser. No. 476,166, Feb. 7, 1990, abandoned.

[51] Int. Cl.$^5$ .................. A63B 37/06; A63B 37/12; C08K 3/34; C08K 9/00
[52] U.S. Cl. .................. 273/230; 260/998.14; 273/218; 273/220; 524/86; 524/430; 524/433; 524/442; 524/908
[58] Field of Search .................. 273/218, 220, 230; 524/908, 86, 430, 433, 422; 260/998.14

[56] References Cited

U.S. PATENT DOCUMENTS

| | | | |
|---|---|---|---|
| 4,556,220 | 12/1985 | Tominaga et al. | 273/218 |
| 4,561,657 | 12/1985 | Tominaga et al. | 524/908 |
| 4,715,607 | 12/1987 | Llort et al. | 273/220 |
| 4,770,422 | 9/1988 | Isaac | 273/230 |
| 4,838,556 | 6/1989 | Sullivan | 524/908 |
| 4,844,471 | 6/1989 | Terence et al. | 273/220 |
| 4,955,613 | 9/1990 | Gendreau et al. | 524/908 |
| 4,971,329 | 11/1990 | Llort et al. | 273/218 |

Primary Examiner—Jacob Ziegler
Attorney, Agent, or Firm—Lorusso & Loud

[57] ABSTRACT

The present invention is a composition for making a solid one-piece golf ball and the core of a two-piece or multi-layer golf ball with a butadiene base crosslinked by a methacrylic acid zinc salt. The resulting product is a golf ball with outstanding performance which possesses both resilience and durability and which can be reproduced accurately and economically. This type of golf ball is suitable for play by tournament caliber golfers.

13 Claims, No Drawings

HIGH PERFORMANCE ONE-PIECE GOLF BALL

BACKGROUND OF THE INVENTION

Cross-Reference to Related Applications

This application is a continuation-in-part of U.S. patent application Ser. No. 07/602,053 filed Oct. 24, 1990; now abandoned, which is a file wrapper continuation of U.S. patent application Ser. No. 07/476,166 filed Feb. 7, 1990; now abandoned.

PRIOR ART

The present invention relates to a one-piece solid golf ball.

Golf balls are classified as either wound or solid. The traditional wound golf ball has a complex structure consisting of rubber threads wound around the center of the ball. The process for making such a ball is time-consuming and expensive.

Solid golf balls are classified as one-piece, two-piece or multi-layer. The one-piece golf ball consists of a single structure, the two-piece golf ball has a solid core covered with a cover and the multi-layer ball has three or more layers with an intermediate layer between the core and the cover.

There has been great technological advancement in the production of one-piece and two-piece golf balls; however, to date there is not in existence, a one-piece golf ball that embodies both performance and durability characteristics suitable for use by serious golfers in tournament play. The two-piece golf ball can be used to the satisfaction of an average golfer; but, a professional golfer would not use this type of ball since it lacks feel and controllability i.e. click of the ball and the ability to control spin, particularly on approach shots. Further, a high performance one-piece golf ball is not commercially practical in that it has not been possible to accurately reproduce it.

Most golf balls are formed from polymerized butadiene. The polybutadiene elastomer is crosslinked by a crosslinking agent which is a rather large quantity of a zinc salt of acrylic or methacrylic acid. An optimal crosslinker would increase hardness without decreasing resilience.

The zinc salts of methacrylic and acrylic acids have shown great promise as crosslinkers for butadiene in the manufacture of solid golf balls, but so far no suitable one-piece golf ball for play by tournament caliber golfers has been made from these materials. Golf ball compounds crosslinked by acrylic acid zinc salts have generally demonstrated superior characteristics in terms of resilience but tend to be less durable. Ball forming compounds crosslinked by methacrylic acid zinc salts produce a ball of superior durability but at the expense of resilience. The following discussion of prior art illustrates these points.

Tominaga et al U.S. Pat. No. 4,561,657 teaches, that an improved golf ball can be made from a rubber composition containing zinc acrylate coated with a fatty acid such as stearic acid whereby the golf ball exhibits proper hardness, good impact resilience and good sound and feel when hit. Another characteristic of this type of rubber composition is that it creates good roll workability and dipersability of rubber additives.

Isaac et al U.S. Pat. No. 4,770,422 discloses an improved golf ball which is durable with good playing characteristics such as good initial velocity. The composition from which this ball is formed comprises polybutadiene crosslinked by zinc diacrylate whereby the amount of free radical initiator is substantially below that typically used in the past. This free radical initiator is necessary to promote the crosslinking reaction.

Tominaga et al U.S. Pat. No. 4,556,220 discloses a golf ball which shows markedly superior rebound performance, durability and flight carry characteristics. This is achieved by forming the ball from polysulfide type compounds which regulate the molecular weight of the chains which result from crosslinking by regulating the length of such chains.

Llort et al U.S. Pat. No. 4,714,607 teaches that a better golf ball is made by using a small amount of zinc diacrylate to crosslink polybutadiene. Zinc diacrylate is used as a first crosslinker and zinc dimethacrylate is used as a second crosslinker. The result is a golf ball with higher initial velocity and higher compression. Natural rubber can be added to improve durability.

Reiter et al U.S. Pat. No. 4,688,801 teaches that a one-piece golf ball can be made with improved compression and fracture strength while the desired rebound, click and feel characteristics are maintained. This is achieved by using a coagent comprising (i) admixture of a polyvalent metal salt of an unsaturated acid and an organic filler or (ii) a reaction product obtained by reaction of an unsaturated carboxylic acid with an organic filler followed by further reaction with a polyvalent metal compound in the presence of said unsaturated carboxylic acid where such coagent functions as a crosslinking agent with the polybutadiene elastomer.

The above-noted prior art is directed to compositions for forming one-piece solid golf balls as well as forming the cores of two-piece golf balls. Likewise, the compositions of the present invention are applicable to solid one-piece golf balls and the cores of two-piece golf balls.

SUMMARY OF THE INVENTION

The present invention is a composition for making a solid one-piece golf ball with a butadiene base which is crosslinked by a methacrylic acid zinc salt. The resulting product is a one-piece golf ball with outstanding performance which possesses both resilience and durability and which can be reproduced accurately and economically. This type of golf ball is suitable for play by tournament caliber golfers. In addition, the material comprising the composition can be used to form the core of a two-piece or multi-layer golf ball.

Accordingly, a principal object of the present invention is to provide a novel composition which will produce a superior one-piece golf ball and a superior core for a multi-piece golf ball.

Another object of the present invention is to provide a one-piece golf ball with outstanding resilience and durability characteristics.

Yet another object of the present invention is to provide a process for producing one-piece golf balls which produces such balls economically and produces balls of the same consistent quality.

Yet a further object of the present invention is to provide a composition for producing a one-piece golf ball that is suitable for play by tournament caliber golfers.

DETAILED DESCRIPTION OF THE PREFERRED EMBODIMENTS

At the outset, the present invention is described in its broadest overall aspects with a more detailed description following. All embodiments of the invention involve a composition which includes a polybutadiene crosslinked with a methacrylic acid zinc salt manufactured under the tradename Z-Max MA. This zinc salt is present in the range of 20 to 70 parts by weight per 100 parts of rubber to be used in formulating the solid one-piece golf ball and the core of the two-piece golf ball. The term rubber is intended to include a major portion of polybutadiene and may include minor portions of other polymers such as natural rubber, polyisoprene rubber, styrene butadiene rubber, ethylene propylene rubber and nitrile elastomers. In all embodiments, the rubber component must include at least 75% by weight of polybutadiene. A table of the essential ingredients and their use ranges, in accordance with the present invention, appears below.

TABLE 1

| | PPH* |
|---|---|
| Essential Ingredients | |
| Rubber | 100 |
| (at least 75% Polybutadiene by weight) | |
| Z-Max MA[1] | 20-70 |
| Vul Cup R[2] | 0.1-3 |
| (a free radical initiator) | |
| Optional Ingredients | |
| Basic lead silicate | 0-15 |
| Titanium dioxide | 0-15 |
| Magnesium oxide | 0-5 |
| Agerite Resin D[3] | 0-2 |
| CAPOWKR 9S/H[4] | 0-2 |
| HVA-2[5] | 0-2 |

*parts per 100 parts of polybutadiene
[1] methacrylic acid zinc salt
[2] t-butyl cumyl peroxide
[3] polymerized 1,2-dihydro-2,2,4-trimethylquinoline
[4] titanium IV, 2-propanolato, tris-(dodecyl)benzene sulfonato-O
[5] N,N-m-phenylene dimaleimide The result of using the composition of the present invention in forming golf balls is a golf ball with outstanding performance. Such golf ball's improved characteristics include resilience, durability and economical reproducibility.

The key feature of the present invention is the methacrylic acid zinc salt used to crosslink the butadiene. This zinc salt is unique in that its crosslinking energy is in the same order as the energy in commercially acceptable zinc salt made from acrylic acid, yet the golf ball produced from this salt cross-linked with polybutadiene is superior to commercially available balls.

Methacrylic acid zinc salt is traditionally made by reacting methacrylic acid with zinc oxide. In accordance with the present invention, the reaction by which the zinc salt is produced is run in an abundance of air with 10% more than the stoichiometric amount needed of zinc oxide. The introduction of oxygen into the reaction prevents polymerization of the methacrylic acid during mixing with polybutadiene rubber. Specifically, the zinc salt and the polybutadiene are blended in a roll mill producing a corrugated surface on one side of the product. This high radiating area keeps the temperature down and thus delays curing until the molding step. The temperature is preferably kept down to 75° C. which is below polymerization temperature. As a result, polymerization and curing takes place during the molding step and not during the mixing step.

In accordance with the present invention, the methacrylic acid zinc salt is prepared by introducing a charge of 44 pounds of zinc oxide to 85 pounds of methacrylic acid along with 0.25 pounds of stearic acid. 20 ml. of sulfuric acid is added as a catalyst. Prior to reaction, the zinc oxide and the stearic acid are dispersed in a solvent which contains heptane and 1,1,1-trichloroethane in about equal parts by volume and has a specific gravity of about 0.98. During the reaction process, the methacrylic acid and sulfuric acid are added into a rotary vacuum drier and heated to 85°-90° C. The solvents including the zinc oxide are then added to the drier. A one second blast of air is bled into the evacuated drier system at 30 second intervals to prevent polymerization of the zinc salt. After approximately 0.75 hours in the rotary vacuum drier, the solvents and water of reaction are substantially removed by vacuum and the resulting product is a solid methacrylic acid zinc salt. The zinc salt is further dried and then reduced to particle size of 1-30 microns. This salt is currently manufactured by Yardley Ball Corporation, Milton, Fla., under the name Z-Max MA (Z-Max) and is referred to herein by that name.

Comparative Examples 1-6 and 8-12 further describe and define the present invention. Z-Max, Z-Max crosslinked with polybutadiene as well as two other commercially available salts, alone and crosslinked with polybutadiene, were analyzed and compared. The analysis was performed by Arthur D. Little Laboratories (ADL) of Cambridge, Mass. The salts compared with Z-Max are Sartomer 365 manufactured under this tradename by Sartomer Co., Inc., Exton, Pa. and ReactRite manufactured under this tradename by Rockland React-Rite, Inc., Cartersville, Ga. Two different samples of Z-Max were analyzed; one sample was manufactured in the old Yardley Ball Corporation plant in Pennsylvania and the other sample was manufactured in the new, currently operating Florida plant. The Pennsylvania sample represents Z-Max which has aged before curing and thus golf balls produced from it would be less resilient and thus less desirable. Z-Max should preferably be used, i.e., cross-linked with polybutadiene, within a week of production.

Examples 1-6 and 8-12 show that many features distinguish Z-Max and the polybutadiene cured with it from other commercially available zinc methacrylate. To begin with, Z-Max has a higher zinc content and fresh Z-Max has a higher exothermic heat of polymerization. The x-ray diffraction pattern of Z-Max shows a stronger peak between 11 and 12 degrees and the particle sizes of Z-Max are the smallest of the group analyzed. The FTIR spectrum of Z-Max has more prominent CO crystalline peaks and the Z-Max samples had the highest solubility in xylene. The heat of curing is highest for the fresh Z-Max sample and polybutadiene cured with Z-Max has the highest Shore Hardness. Finally, Z-Max samples have lower swell indices than the other samples tested.

Examples 1-6, shown below, provide the results of: 1) elemental analysis 2) differential scanning calorimetry 3) X-ray diffraction 4) microscopic examination 5) Fourier

EXAMPLE 1

The analysis for zinc content in the samples was carried out by plasma analysis. The samples were also vacuum dried and analyzed for zinc, carbon and hydrogen at Galbraith Laboratories, Inc., (GLI) in Knoxville, Tenn. The results are shown below. 'N.A.'=Not applicable.

| WEIGHT % ELEMENT IN ZINC SALTS | | | | | |
|---|---|---|---|---|---|
| | % Zn | | | | % O by |
| Salt | GLI | ADL | % C | % H | difference |
| Theoretical Zinc Methacrylate | 27.8 | N.A. | 40.8 | 4.3 | 27.2 |
| PA Z-Max 1-91 | 30.6 | N.A | 35.8 | 3.9 | 29.7 |
| PA Z-Max 10-90 | N.A. | 29 | 37.8 | 4.0 | 29 |
| FL Z-Max | 28.2 | N.A. | 38.3 | 4.1 | 29.4 |
| Sartomer 365 | 29.4 | 29 | 37.7 | 3.8 | 29.1 |
| ReactRite | 27.0 | 27 | 39.5 | 4.5 | 29.0 |

All samples, except ReactRite, contained more than the theoretical proportion of zinc; especially the FL Z-Max sample. All samples, especially the FL Z-Max, contained more than the theoretical proportion of oxygen and less than the theoretical proportion of carbon. These results are consistent with known addition of excess zinc oxide in the production of Z-Max and indicate that the salts had been oxidized; especially the FL Z-Max. In hydrogen content, the Z-Max and Sartomer samples were below that calculated by theory, but the ReactRite hydrogen content was high. This result suggests that ReactRite contained unreacted methacrylic acid or its polymer.

EXAMPLE 2

The heat of reaction by thermal analysis is known in the art to correlate with chemical reactivity in curing polybutadiene. Each sample was analyzed using a DuPont 910 Differential Scanning Calorimeter (DSC) with a 20° C./minute oven ramp, nitrogen atmosphere to 300° C. in hermetically sealed pans. Each sample showed an exothermic peak due to heat of polymerization. The peak temperature in degrees centigrade and the heat of polymerization in joules per gram (J/g) were recorded. The older Z-Max sample also showed an endothermic heat of melting, apparently of a crystalline species formed on storage. It is noted that the structure of the cured polymer is influenced by the rate of cooling.

| DSC RESULTS WITH ZN SALTS | | | | |
|---|---|---|---|---|
| Property/Salt | PA Z-Max | FL Z-Max | ReactRite | Sartomer 365 |
| Endotherm, 130° C. | 28.6 J/g | None | None | None |
| Exotherm, J/g | 138 | 170 | 61 | 73.9 |
| Peak Temp. °C. | 140 | 217 | 115 | 225 |
| Exotherm J/g after annealing at 125° C. 15 min. and slow cooling | 243 | No | N.A. | 62.7 |
| Peak Temp.°C. | 209 | N.A. | N.A. | 218 |
| Melted,-Polymerized and quench cooled with liquid nitrogen J/g | 57.5 | N.A. | N.A. | 70.9 |
| Temp. Peaks | 213, 248, | N.A. | N.A. | 221 |

| DSC RESULTS WITH ZN SALTS | | | | |
|---|---|---|---|---|
| Property/Salt | PA Z-Max | FL Z-Max | ReactRite | Sartomer 365 |
| °C. | | 260 | | |

EXAMPLE 3

To perform the X-ray diffraction spectroscopy, the dry powders were each pressed in an aluminium frame. The diffraction patterns with CuK alpha radiation show no zinc oxide left in the samples.

| X-RAY DIFFRACTION PEAK ANGLES | | | | |
|---|---|---|---|---|
| Angle, Degrees | PA Z-Max | FL Z-Max | ReactRite | Sartomer 365 |
| 7.3 | Strong | Absent | Absent | Weak |
| 9.8 | Strong | Strong | Strong | Very Strong |
| 10.6 | Medium | Medium | Somewhat Strong | Very Strong |
| 11.6 | Somewhat Strong | Somewhat Strong | Weak | Medium |
| Extent of Crystalline Part | 2 | 3 | 4(Least) | 1(Most) |

The ReactRite sample clearly has the largest amorphous phase and fewer crystals of one of the phases shared by the other two samples. The Z-Max and Sartomer samples appeared to contain mostly crystals and all samples had at least four crystalline planes. The Sartomer sample had particularly strong bands in the peaks at 9 to 10 and at 10 to 11 degrees and showed the most complicated crystalline pattern. As a check, an X-ray spectrum was run on a known zinc acrylate and compared to a methacrylate sample.

After treatment with ethyl alcohol, the X-ray spectra of the PA Z-Max and the Sartomer 365 samples were shown to be similar, with strong peaks between 9 and 10 degrees and just below 11 degrees. After alcohol treatment, the ReactRite had only one crystalline peak just below 11 degrees and a broad amorphous peak just below that.

EXAMPLE 4

The various zinc methacrylate samples were examined under the microscope at 150 and 300 x magnification. The Z-Max particles were the smallest and most rounded, the Sartomer particles were the largest and constituted highly crystalline acicular flat planes. The ReactRite particles in xylene showed birefringence, suggesting a transition between amorphous and crystalline forms.

| MICROSCOPICAL EXAMINATION | | | | |
|---|---|---|---|---|
| Method | PA Z-Max | FL Z-Max | ReactRite | Sartomer 365 |
| Microscopy Microns, Dia. | Mostly 3-10 Up to 35 | 1-5 | 5-25 | 5-200 Up to 200 |
| Shape | All Irreg. | Irreg. | Round & Needles | Needles |
| Crystals | Some particles crystalline & amorphous or poorly crystallized | | | Rectangular Crystalline Plates |

The finer particle size of the Z-Max samples corresponds with larger surface area for increased reactivity. The Florida Z-Max appeared to be less completely crystalline than the Sartomer. The particle sizes of the Z-Max were much smaller than those of the two other salts. The Sartomer sample appeared to be highly crystalline, in agreement with x-ray observation. The ReactRite sample had a mixture of acicular crystals and irregular roundish amorphous-looking particles. As a check, a known Sartomer zinc acrylate was examined microscopically and compared to methacrylate.

EXAMPLE 5

Over 40 scans were taken with a Bio-Rad FTS spectrophotometer with the averages used to provide results. The infrared spectra differed among the samples, in that the Z-Max samples had an additional band at 1090 reciprocal cm where carbon-to-oxygen bonds generally appear. The Z-Max samples also showed a greater number of crystalline peaks. The crystal form of Z-Max is clearly different from that of the other salts analyzed.

| RESULTS FROM INFRARED SPECTROSCOPY | | | | |
| --- | --- | --- | --- | --- |
| CO Peaks | PA Z-Max | FL Z-Max | ReactRite | Sartomer 365 |
| 1090 | CO Band | CO Band | No extra CO | No extra CO |
| 1545 and 710 Suggesting Crystallinity | Yes | More | Fewer | Fewer |

EXAMPLE 6

Excess xylene was mixed thoroughly with a weighed sample of zinc salt. The excess of solvent was decanted off. A heat lamp was used to evaporate xylene from both the soluble and insoluble portions before weighing. The weight percentages recovered (some was lost on evaporation) are given below.

| XYLENE SOLUBILITY | | | | | |
| --- | --- | --- | --- | --- | --- |
| PA Z-Max | | FL Z-Max | | ReactRite | |
| Soluble | Insoluble | Soluble | Insoluble | Soluble | Insoluble |
| 72 | 19 | 62 | 29 | 38 | 57 |

The FL Z-Max had about 10% more insoluble material than the PA Z-Max sample. The ash contents of PA Z-Max corresponded to between 29 and 30% zinc for both the soluble and insoluble phases. The FL Z-Max had similar results. For ReactRite, the soluble portion ash content corresponded to 32% zinc and the insoluble portion to 26%.

At this point a discussion regarding the usual composition of the base of the solid one-piece golf ball or the core of the two-piece golf ball is appropriate. Such a description follows.

Butadiene rubber, that is cis-1,4 polybutadiene rubber, is the primary elastomer component, but other elastomers may also be present in smaller quantities. Natural rubber for example, may be added to lower modulus and improve durability. In addition to the methacrylic acid zinc salt constituent and the free radical or peroxide initiator, numerous other ingredients may be incorporated into the solid ball compound. The composition usually contains fillers such as zinc oxide, barium sulfate, lead oxide, basic lead silicate, or the like, used singularly or in combination, to control the weight of the ball. Other additives may include: magnesium oxide, calcium carbonate as fillers and/or acid acceptors; mildly reinforcing fillers and/or nucleating agents such as silicas, carbon blacks, clays and the like; silanes and/or titanates as bonding and/or dispersing agents; antioxidants for improving process, heat and shelf aging properties; co-curing agents such as HVA-2, TMPTA, TMPTMA and the like; cure modifying agents such as sulfur and sulfur bearing compounds; granular or powdered high molecular weight polymeric materials as impact modifiers; pigments and other ingredients for imparting various characteristics known by those skilled in the art of rubber compounding for golf balls.

This composition is then kneaded by a suitable kneader, mixer or blender such as a roll mill or a Banbury mixer. Next, the rubber composition is molded using, for instance, heat pressure molding. A one-piece golf ball is prepared by heat-pressure molding the rubber composition into a ball having the size suitable for a golf ball. A two-piece golf ball is prepared by heat-pressure molding the rubber composition in a core mold having a suitable size to form a solid core and covering the core with a suitable cover. The cover can be prepared from compositions comprising, for instance, an ionomer resin as a main component and optionally a filler or coloring agent such as a titanium dioxide or zinc oxide. The solid core is covered with two covers previously molded in the form of a hemispherical shell and is then heat-pressure molded to fuse the two shells together to give a finished golf ball. Injection molding is also used to introduce the covering material around the core.

One important embodiment of the composition of the present invention comprises high cis polybutadiene as the primary elastomer, Z-Max MA crosslinker in the range of between 20 to 70 parts, based on 100 parts of elastomer, basic lead silicate as filler-for-weight in the range of 5 to 15 parts, titanium dioxide pigment in the range of 0 to 15 parts, magnesium oxide acid acceptor in the range of 0 to 5 parts, AgeRite Resin D antioxidant in the range of 0 to 2 parts, CAPOW KR 9S/H titanate in the range of 0 to 2 parts, Vul Cup R peroxide initiator in the range of 0.1 to 3 parts, and HVA-2 co-curing agent in the range of 0 to 2 parts. The compound is mixed at a temperature of 20° to 150° C. in a Banbury mixer or a roll mill, then molded for 20 minutes at 175° C. in a 1.727"golf ball mold.

The following is an example of the preferred embodiment.

EXAMPLE 7

| HIGH PERFORMANCE ONE-PIECE GOLF BALL | |
| --- | --- |
| Compound: GB-1 | Parts by weight |
| Polybutadiene (high cis) | 100 |
| Z-Max MA[1] | 48 |
| Basic lead silicate | 6 |
| Titanium dioxide | 3 |
| Magnesium oxide | 1 |
| AgeRite Resin D[2] | .03 |
| CAPOW KR 9S/H[3] | .20 |
| Vul Cup R[4] | .53 |
| HVA-2[5] | .16 |
| Total | 158.92 |

[1]methacrylic acid zinc salt-Yardley Ball Corp.
[2]polymerized 1,2-dihydro-2,2,4-trimethylquinoline - R. T. Vanderbilt Company -continued

[3] titanium IV, 2-propanolato, tris-(dodecyl)benzene sulfonato-O - Kenrich Petrochemicals, Inc.
[4] t-butyl cumyl peroxide - Hercules, Inc.
[5] N,N-m-phenylene dimaleimide - E. I. DuPont de Nemours & Co..

The resulting typical ball properties are:

| | |
|---|---|
| Shore C | 93 |
| Compression | 122 |
| COR | .796 |
| I.V. ft/sec | 254.6 |

Comparative Examples 8-12 which appear below show the differences between the conventional salt-polybutadiene compositions and the Z-Max-polybutadiene compositions. The compositions were prepared in accordance with the teachings of the present invention. The following analyses were performed: 1) heats of crystallizing and curing rubbers 2) exothermic recrystallization heat of cured samples 3) Shore hardness and 4) swell index.

EXAMPLE 8

The below-listed ingredients were mixed with a Type PL-V302 Brabender PlastiCorder, Serial Number 177518, with electrical heating, air cooling and variable speed one horsepower Type GP 100 Drive. Titanium dioxide, an inert pigment, was omitted to facilitate examination by infrared spectrophotometry.

| Grams | Ingredients |
|---|---|
| 34.5 | High cis-polybutadiene from Dunlop Slazenger, Greenville, South Carolina |
| 0.138 | AgeRite Resin D, R. T. Vanderbilt poly(trimethyl dihydroquinoline) antioxidant |
| 0.3485 | Magnesium Oxide, to neutralize acid |
| 0.069 | Capow KR 9S/H, Kenrich Petrochemical monoalkoxy titanate coupling agent on a hydroxylated silicon dioxide carrier |

These materials were mixed at a temperature in the 90° to 100° C. range to masticate the rubber for 11 or 12 minutes. The mixture was then allowed to cool to about 96°-108° C. by reducing the stirring speed. Next, 15.962 g of one of the four zinc salts of methacrylic acid was added; Sartomer 365, ReactRite, PA Z-Max or FL Z-Max. After a dozen minutes of stirring, during which time the temperature was not allowed to exceed 113° C., the stirrer was slowed and the temperature allowed to fall to about 102° C. for the addition of the curing agents which are listed below.

| Grams | Ingredients |
|---|---|
| 0.1242 | Di Cup R from Hercules, dicumyl peroxide |
| 0.1242 | Vul Cup R from Hercules, t-butyl cumyl peroxide |
| 0.0552 | HVA-2 from DuPont, N,N'-m-phenylenebismaleimide |

These ingredients were blended for 6 minutes with the temperature kept down to 100°-102° C. to prevent premature curing. Cylindrical moldings about 6 mm thick and 32 mm wide were produced by curing at 160° C. for 20 minutes in a press at 10,000 pounds on a 4-inch ram. The round mold was about 2 inches in outer diameter.

EXAMPLE 9

The samples in the compound with rubber were cured in the DSC and the heats of crystallizing and curing of the rubbers were measured. This important exothermic heat was determined at 20° C./minute The preceding crystallization exotherms were determined at both 5° and 20° C.

| DSC HEATS OF CURING AND CRYSTALLIZATION | | | | |
|---|---|---|---|---|
| Zinc Salt | PA Z-Max | FL Z-Max | Sartomer 365 | ReactRite |
| | 20° C./Minute Rate of Increase | | | |
| Heat of Curing J/g Initial Spike | 5.50 | 8.78 | 6.14 | 17.28 |
| Broad Second Temperatures, °C. | 46.21 | 95.80 | 46.93 | 22.96 |
| First Peak: | | | | |
| Onset | 159.1 | 158.8 | 159.2 | 159.1 |
| Peak | 162.1 | 161.6 | 162.0 | 161.8 |
| Second Peak: | | | | |
| Peak | 190.4 | 189.5 | 192.2 | 196.4 |
| | 5° C./Minute Rate of Increase | | | |
| First Peak: (at 159° C.): | | | | |
| Heat, J/g | 5.48 | 6.93 | 6.37 | 5.49 |

The above-shown results show that the FL Z-Max sample cured more than twice as energetically as the Sartomer 365. The ReactRite peak was not only smaller in area but more spread out. The heat of curing is highest for FL Z-Max and lowest for ReactRite.

When the uncured compound is heated at 20° C./minute, the heat flow after the first peak subsides to the base line followed by an excursion to the second peak. Because other sharp exothermic spikes occur at the same temperature in cured rubbers as in the uncured compound, when the temperature is increased at the same rate, the first exothermic peak is considered due to crystal reorganization and the second to the curing reaction. The ReactRite sample, which appeared least crystalline by microscope and x-ray, had the largest crystallization exotherm at the 20° C./minute heating rate but one of the lowest heats at the 5° C./minute rate. This difference suggests that the sample is not homogeneous.

EXAMPLE 10

The exothermic recrystallization heat of the cured samples was measured. Since curing had been carried on for 20 minutes, the transitions in the cured compounds as noted below are concluded to have been physical rather than chemical. In every case, spike exotherms of the cured rubbers began at 157.5° C. and peaked at 158° to 159° C. When the cured rubbers were programmed in the DSC at a 5° C./minute increase in temperature, they revealed spike exotherms at about 159° C. which are considered due to reorganization in structure.

| EXOTHERMIC TRANSITION | |
|---|---|
| Zinc Salt | Exothermic Heat, J/g at 158-159° C. |
| PA Z-Max | 15.4 |
| FL Z-Max | 15.8 |
| Sartomer 365 | 19.0 |
| ReactRite | 7.64 |

The samples were close in heat of crystallization except for cured ReactRite which was significantly lower. This may be due to a less desirable form of cross-linking, such as the carbon-carbon bonds formed by peroxides, especially when zinc methacrylate is absent or less active.

EXAMPLE 11

Shore hardness measurements were performed on all samples. Each molding was measured after aging for at least five days. The five measurements were at least 0.5 inch in from the edge as prescribed by ASTM. Averages of the measurements were taken and are shown below.

| Zinc Salt | SHORE HARDNESS Hardness Readings | Average |
|---|---|---|
| PA Z-Max | 49 47 50 49 51 | 49.2 |
| FL Z-Max | 49 52 53 51 54 | 51.8 |
| Sartomer 365 | 47 48 48 48 48 | 47.8 |
| ReactRite | 26 28 26 26 26 | 26.4 |

It is important to note, that the Z-Max samples were harder than the other two samples indicating a higher degree of cross-linking reaction for the same proportion of reagent.

EXAMPLE 12

The swell index was measured for each sample. This index represents the equilibrium weight of toluene absorbed by a cured rubber divided by the initial weight of the rubber. For example, an uptake of 69% is a swell index of 0.69. Parts of the moldings described above were weighed into an excess of freshly opened scintillation grade toluene and observed over four days of aging. Each day the swollen rubber samples were blotted and weighed in grams. The following results may vary in the last figure due to variability in blotting technique.

| WEIGHTS OF POLYBUTADIENE WITH TOLUENE | | | | | |
|---|---|---|---|---|---|
| Zinc Salt/days | 0 | 1 | 2 | 3 | 4 |
| PA Z-Max | 2.267 | 3.652 | 3.693 | 3.755 | 3.828 |
| FL Z-Max | 2.281 | 4.534 | 4.752 | 4.752 | 4.708 |
| Sartomer 365 | 1.992 | 3.989 | 4.136 | 4.243 | 4.291 |
| ReactRite | 2.508 | 5.771 | 5.819 | 5.870 | 5.932 |

After four days, the solvent uptake was 69 weight percent toluene for the PA Z-Max, 106% for the FL Z-Max, 115% for Sartomer and 136% for ReactRite. This difference indicates that the polybutadiene cured with Z-Max was more resistant to solvent and therefore more cross-linked than the polybutadiene cured with the other salts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and there is no intention to exclude any equivalence thereof. Hence, it is recognized that various modifications are possible when within the scope of the present invention as claimed.

What is claimed is:

1. A method for making an improved high performance one-piece golf ball comprising:
   (a) providing a golf ball forming composition comprising:
      (i) rubber, including at least 75% by weight cis-1,4 polybutadiene; 100 parts,
      (ii) methacrylic acid zinc salt in the range of 20 to 70 parts per 100 parts of rubber, said salt being the reaction product of zinc oxide and methacrylic acid said zinc salt being present in 10% more than the stoichiometric amount need of zinc oxide, such reaction taking place in the presence of oxygen to reduce polymerization, said reaction being performed by introducing oxygen into the reaction sufficient to prevent polymerization of the zinc salt,
      (iii) basic lead silicate in the range of 0 to 15 parts per 100 parts of rubber,
      (iv) titanium dioxide in the range of 0 to 15 parts per 100 parts of rubber,
      (v) magnesium oxide in the range of 0 to 5 parts per 100 parts of rubber,
      (vi) polymerized 1,2-dihydro-2,2,4-trimethylquinoline in the range of 0 to 2 parts per 100 parts of rubber,
      (vii) titanium IV, 2-propanolato, tris-(dodecyl)benzene sulfonato-0 in the range of 0 to 2 parts per 100 parts of rubber,
      (viii) free radical initiator in the range of 0.1 to 3 parts per 100 parts of rubber, and
      (ix) N,N-m-phenylene dimaleimide in the range of 0 to 2 parts per 100 parts of rubber,
   (b) mixing the composition of step (a) to form a reaction mixture, and
   (c) molding the composition to form a golf ball.

2. The method of claim 1 wherein the methacrylic acid zinc salt (ii) has a crosslinking energy in the order of 180 Joules per gram or greater.

3. The method of claim 1 wherein the basic lead silicate (iii) is in the range of 5 to 15 parts per 100 parts of rubber.

4. The method of claim 1 wherein the free radical initiator (viii) is t-butyl cumyl peroxide.

5. The method of claim 1 wherein the mixing step (b) is carried out at a temperature in the range of 20° to 150° C.

6. The method of claim 1 wherein the molding step (c) is carried out at a temperature of 175° C. for 20 minutes.

7. A composition comprising:
   (a) cis-1,4 polybutadiene rubber; 100 parts,
   (b) methacrylic acid zinc salt in the range of 20 to 70 parts per 100 parts of rubber, said salt being the reaction product of zinc oxide and methacrylic acid said zinc salt being present in 10% more than the stoichiometric amount need of zinc oxide, such reaction taking place in the presence of oxygen to reduce polymerization, said reaction being performed by introducing oxygen into the reaction sufficient to prevent polymerization of the zinc salt,
   (c) basic lead silicate in the range of 5 to 15 parts per 100 parts of rubber,
   (d) titanium dioxide in the range of 0 to 15 parts per 100 parts of rubber,
   (e) magnesium oxide in the range of 0 to 5 parts per 100 parts of rubber,
   (f) polymerized 1,2-dihydro-2,2,4-trimethylquinoline in the range of 0 to 2 parts per 100 parts of rubber, (g) titanium IV, 2-propanolato, tris-(dodecyl)benzene sulfonato-0 in the range of 0 to 2 parts per 100 parts of rubber, (h) t-butyl cumyl peroxide in the range of 0.1 to 3 parts per 100 parts of rubber, and (i) N,N-m-phenylene dimaleimide in the range of 0 to 2 parts per 100 parts of rubber.

8. A high performance one-piece golf ball, said ball being formed from a composition comprising:

(a) rubber, including 75% by weight cis-1,4 polybutadiene; 100 parts, (b) methacrylic acid zinc salt in the range of 20 to 70 parts per 100 parts of rubber, said salt being the reaction product of zinc oxide and methacrylic acid said zinc salt being present in 10% more than the stoichiometric amount need of zinc oxide, such reaction taking place in the presence of oxygen to reduce polymerization, said reaction being performed by introducing oxygen into the reaction sufficient to prevent polymerization of the zinc salt, (c) basic lead silicate in the range of 0 to 15 parts per 100 parts of rubber, (d) titanium dioxide in the range of 0 to 15 parts per 100 parts of rubber, (e) magnesium oxide in the range of 0 to 5 parts per 100 parts of rubber, (f) polymerized 1,2-dihydro-2,2,4-trimethylquinoline in the range of 0 to 2 parts per 100 parts of rubber, (g) titanium IV, 2-propanolato, tris-(dodecyl)benzene sulfonato-0 in the range of 0 to 2 parts per 100 parts of rubber, (h) free radical initiator in the range of 0.1 to 3 parts per 100 parts of rubber, and (i) N,N-m-phenylene dimaleimide in the range of 0 to 2 parts per 100 parts of rubber.

9. The ball of claim 8 wherein the basic lead silicate is in the range of 5 to 15 parts per 100 parts of rubber.

10. The ball of claim 8 wherein the free radical initiator is t-butyl cumyl peroxide.

11. A method for making an improved high performance one-piece golf ball comprising:

(a) providing a golf ball forming composition comprising:

(i) rubber, including 75% by weight cis-1,4 polybutadiene; 100 parts, (ii) methacrylic acid zinc salt in the range of 20 to 70 parts per 100 parts of rubber, said salt being the reaction product of zinc oxide and methacrylic acid said zinc salt being present in 10% more than the stoichiometric amount need of zinc oxide, such reaction taking place in the presence of oxygen to reduce polymerization, said reaction being performed by introducing oxygen into the reaction sufficient to prevent polymerization of the zinc salt, (iii) filler in the range of 0 to 15 parts per 100 parts of rubber, (iv) polymerized 1,2-dihydro-2,2,4-trimethylquinoline in the range of 0 to 2 parts per 100 parts of rubber, (v) titanium IV, 2-propanolato, tris-(dodecyl)benzene sulfonato-0 in the range of 0 to 2 parts per 100 parts of rubber, (vi) free radical initiator in the range of 0.1 to 3 parts per 100 parts of rubber, (vii) N,N-m-phenylene dimaleimide in the range of 0 to 2 parts per 100 parts of rubber, (b) mixing the composition of step (a) to form a reaction mixture, and (c) molding the composition to form a golf ball.

12. A composition comprising:

(a) cis-1,4 polybutadiene rubber; 100 parts, (b) methacrylic acid zinc salt in the range of 20 to 70 parts per 100 parts of rubber, said salt being the reaction product of zinc oxide and methacrylic acid said zinc salt being present in 10% more than the stoichiometric amount need of zinc oxide, such reaction taking place in the presence of oxygen to reduce polymerization, said reaction being performed by introducing oxygen into the reaction sufficient to prevent polymerization of the zinc salt, (c) basic lead silicate in the range of 0 to 15 parts per 100 parts of rubber, (d) titanium dioxide in the range of 0 to 15 parts per 100 parts of rubber, (e) magnesium oxide in the range of 0 to 5 parts per 100 parts of rubber.

(f) polymerized 1,2-dihydro-2,2,4-trimethylquinoline in the range of 0 to 2 parts per 100 parts of rubber, (g) titanium IV, 2-propanolato, tris-(dodecyl)benzene sulfonato-0 in the range of 0 to 2 parts per 100 parts of rubber, (h) t-butyl cumyl peroxide in the range of 0.1 to 3 parts per 100 parts of rubber, and (i) N,N-m-phenylene dimaleimide in the range of 0 to 2 parts per 100 parts of rubber.

13. A method for making an improved high performance one-piece golf ball comprising:

(a) providing a golf ball forming composition comprising:

(i) rubber, including 75% by weight cis-1,4 polybutadiene; 100 parts, (ii) methacrylic acid zinc salt in the range of 20 to 70 parts per 100 parts of rubber, said salt being the reaction product of zinc oxide and methacrylic acid said zinc salt being present in 10% more than the stoichiometric amount need of zinc oxide, such reaction taking place in the presence of oxygen to reduce polymerization, said reaction being performed by introducing oxygen into the reaction sufficient to prevent polymerization of the zinc salt, (iii) filler in the range of 0 to 15 parts per 100 parts of rubber, (iv) antioxidant in the range of 0 to 2 parts per 100 parts of rubber, (v) coupling or dispersing agent in the range of 0 to 2 parts per 100 of rubber, (vi) free radical initiator in the range of 0.1 to 3 parts per 100 parts of rubber, and (vii) co-curing agent in the range of 0 to 2 parts per 100 parts of rubber, (b) mixing the composition of step (a) to form a reaction mixture, and (c) molding the composition to form a golf ball.

* * * * *